Patented July 29, 1930

1,771,828

UNITED STATES PATENT OFFICE

HONORÉ TOMANN, OF LILLE, FRANCE

RAPIDLY DESTARCHING FIBERS OR FABRICS

No Drawing. Application filed March 25, 1924, Serial No. 701,870, and in France April 4, 1923.

This invention relates to a process for rapidly destarching fibers or fabrics, according to which the action of destarching materials to be found in commerce (diastase from malt or other material, pancreatine, syrups made from malt, diastafor, rapidase, rapidiastase, fermasol) is incited, developed and used quantitatively by reason of the fact that the textile to be destarched after having been impregnated with a solution of the destarching material is subjected to a sudden rise of temperature localized to the solution of the destarching product impregnating the textile. This rise of temperature must be sudden and short-timed, for example of one minute, and may be produced by a passage of short duration of the fabric impregnated with the solution of destarching material, through a medium having no solvent action heated to the desired temperature, or by contact of the fabric with a heated surface, or by any other means, provided that this means does not involve the dissipation of the active destarching agent and maintains intimate contact of the whole of the agent in operation with the textile to be destarched.

Mechanically the process is realized by conducting, for example, the fabric impregnated with a solution of the determined concentration of the destarching agent (by passage through a fulling machine having one or more pairs of pressure rollers as may be necessitated by the resistance of the material to penetration by the destarching agent), directly or not, according to one method, into a closed compartment heated so that the interior thereof is kept at 90–100° C. during the passage of the material to be destarched, the speed of passage being controlled in such a manner that any portion remains in the compartment for about one minute; it is a matter of indifference how the heating is conducted, for instance it may be performed directly by injection of steam or heated air, or indirectly by pipes conveying hot air or steam. The compartment may be provided with a device for removing the air saturated with water vapour and with suitable heat insulation to minimize loss of heat.

By another method the fabric impregnated with a solution of a destarching agent may be passed for example through the rollers of a drying machine heated in such a manner that during the contact the temperature of the solution impregnating the fabric has attained 95–100° C.

This phase, during which the destarching agent takes effect, may be completed by a washing in boiling water, which will eliminate the products of the reaction; for this purpose the goods may be passed rapidly through a compartment containing water kept in constant ebullition.

The invention facilitates continuous destarching, the fabric passing successively through an impregnating fulling machine, where it remains only for some seconds, then through a heated compartment or over heated rollers, where it remains for about a minute, and finally through the compartment in which it is washed with boiling water, where it remains for about another minute; the travel of the fabric may be by means of rollers in known manner, or by any other means (frames carrying clamps or pins.)

The solution of the destarching agent used in the fulling machine may be of very small volume and may be maintained at the surrounding temperature, thus ensuring as far as possible the preservation of the bath and preventing loss of active agent owing to the small quantity of solution in use.

The passage through the fulling machine being merely for the purpose of impregnation, it is easy to maintain the destarching bath at a regularly constant concentration.

The process used for suddenly raising the temperature of the impregnated fabric permits the full utilization of the increase of vitality of the living organisms which are effective in the destarching, this increased vitality translating itself into an increased action on the matters to be changed and thus effecting the complete destarching before the transforming agents are destroyed. As this action is limited to the solution with which the fabric is impregnated, which solution is of concentration adapted to transform into soluble products the starchy or like materials present in the fabric the action does not involve secondary losses extending to portions of the solution subjected to the destructive high temperature before they have performed wholly or in part their function from the point of view of the destarching.

The process ensures a maximum output and does not present any practical difficulties, since it merely consists in bringing into intimate contact under the conditions which are most effective the whole of the active destarching agent brought into play with the starchy matters on which they are to act, this contact being brought about in a minimum space.

What I claim is:

A process for rapidly destarching fibers or fabrics, wherein the textiles to be destarched are first impregnated with a diastase solution and are then immediately subjected to a sudden rise of temperature up to about 95° C., without heating the diastase bath itself, but localizing said rise of temperature only to that part of the diastase solution with which the textiles are impregnated.

In witness whereof I have hereunto signed my name this 10th day of March, 1924.

HONORÉ TOMANN.